(12) United States Patent
Mahowald et al.

(10) Patent No.: US 7,656,168 B2
(45) Date of Patent: Feb. 2, 2010

(54) NEUTRALIZING ELECTROMAGNETIC NOISE FOR A CAPACITIVE INPUT DEVICE

(75) Inventors: Peter H. Mahowald, Los Altos, CA (US); Robert Elsheimer, Fort Collins, CO (US); Brian J. Misek, Fort Collins, CO (US); Robert M. Thelen, Fort Collins, CO (US); Zachary T. Deitz, Fort Collings, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 962 days.

(21) Appl. No.: 11/287,950

(22) Filed: Nov. 28, 2005

(65) Prior Publication Data

US 2007/0120831 A1    May 31, 2007

(51) Int. Cl.
*G01R 27/26* (2006.01)
(52) U.S. Cl. .................. 324/660; 324/679; 324/658
(58) Field of Classification Search ............. 324/661, 324/658, 649, 600, 662, 663, 671, 674, 678, 324/681, 686, 688, 765, 679, 660; 73/780, 73/862.043; 33/1 N, 1 PT, 706
See application file for complete search history.

(56) References Cited

U.S. PATENT DOCUMENTS

| 4,893,071 | A  | * | 1/1990 | Miller ..................... 324/660 |
| 5,670,887 | A  | * | 9/1997 | Andermo et al. ............ 324/684 |
| 6,239,788 | B1 | * | 5/2001 | Nohno et al. ............... 345/173 |
| 6,380,931 | B1 | * | 4/2002 | Gillespie et al. ............. 345/173 |
| 6,989,677 | B2 | * | 1/2006 | Morimoto ................... 324/660 |
| 2003/0098699 | A1 | * | 5/2003 | Lemkin et al. .............. 324/678 |
| 2004/0004488 | A1 |   | 1/2004 | Baxter |
| 2005/0099188 | A1 |   | 5/2005 | Baxter |

FOREIGN PATENT DOCUMENTS

| EP | 0 818 751 A1 | 1/1998 |
| JP | 2003035615 A2 | 2/2003 |
| WO | WO 98/02964 | 1/1998 |

* cited by examiner

*Primary Examiner*—Hoai-An D Nguyen

(57) ABSTRACT

A method of capturing user control inputs for an electronic device comprises sampling an input measurement signal at a capacitive input sensor of the electronic device to capture user control inputs for operating the electronic device. Electromagnetic interference affecting the sampling of the input measurement signal is electronically neutralized.

11 Claims, 9 Drawing Sheets

NEUTRALIZING ELECTROMAGNETIC NOISE FOR A CAPACITIVE INPUT DEVICE

BACKGROUND

Various user input devices such as optical pointing devices, touchscreens, rocker switches, and other mechanisms enable capturing user control inputs for controlling an electronic device. One type of user input device is a capacitive input device, which relies on tracking changes in charge at one or more pairs of capacitively coupled conductive elements. A relative change in the charge, based on a user manipulation at the capacitive input device, generally corresponds to an intended user control input at an electronic device.

Unfortunately, capacitive input devices are negatively affected by electromagnetic noise or interference emanating from other circuitry within or near the electronic device, as well as by wireless communications occurring adjacent the capacitive input device. In particular, electromagnetic noise causes a change in the charge being tracked at the capacitively coupled conductive elements of the capacitive input device. This change caused by noise becomes erroneously interpreted as an intended user control input to the electronic device. Accordingly, a function of the electronic device is triggered or modified by the electromagnetic interference in a manner that does not actually correspond with an intended user control input.

Users of electronic devices expect precision and accuracy in capturing their intended control of the portable electronic device. Conventional attempts by designers and manufacturers of electronic devices to reduce the impact of electromagnetic noise, such as conventional shielding and filtering mechanisms, have fallen short of effectively counteracting the presence of electromagnetic noise during use of capacitive input devices.

SUMMARY

Embodiments of the invention are directed to neutralizing electromagnetic noise for a capacitive input sensor of a user control input device. In one embodiment, a method of capturing user control inputs for an electronic device comprises sampling an input measurement signal at a capacitive input sensor of the electronic device to capture user control inputs for operating the electronic device. Electromagnetic interference affecting the sampling of the input measurement signal is electronically neutralized.

DETAILED DESCRIPTION

Figure 1:
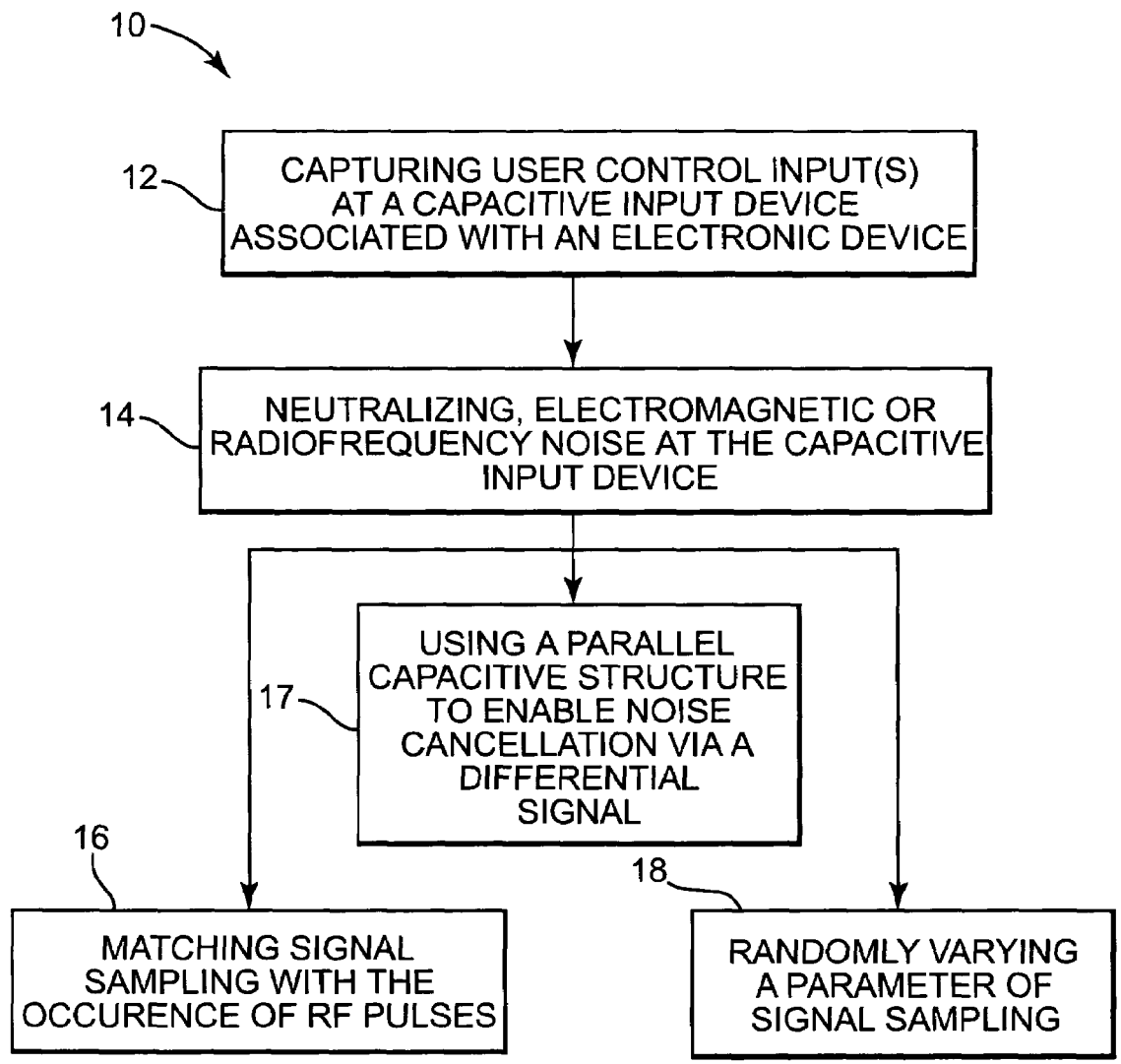
FIG. 1 is a flow diagram illustrating a method of capturing user control inputs, according to an embodiment of the invention.

In the following Detailed Description, reference is made to the accompanying drawings, which form a part hereof, and in which is shown by way of illustration specific embodiments in which the invention may be practiced. In this regard, directional terminology, such as "top," "bottom,""front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the invention are directed to neutralizing electromagnetic noise that interferes with a capacitive input device for an electronic device. The electromagnetic noise is neutralized, via one or more mechanisms directly incorporated into the capacitive input device, at (or adjacent) the time of performing sampling of a measurement signal at the capacitive input device.

In one embodiment, the electromagnetic noise comprises pulses of a radiofrequency signal present adjacent the capacitive input device. The radiofrequency pulses are transmitted or received by the electronic device associated with the capacitive input device or by other devices within the vicinity of the capacitive input device. In one aspect, this electromagnetic noise is neutralized by sampling a measurement signal at the capacitive input device only in the absence of radiofrequency pulses, such as during the time period in between adjacent pulses. In another aspect, the electromagnetic noise is neutralized by sampling a measurement signal at the capacitive input device only in presence of radiofrequency pulses, such as the during radiofrequency pulses, but not during the time period between adjacent pulses. In another aspect, the sampling is performed only during radiofrequency pulses or only in the absence of radiofrequency pulses, so long as the amount of electromagnetic noise from radiofrequency pulses is substantially the same throughout the sampling of the measurement signal at the capacitive input device.

In another embodiment, electromagnetic noise is present within the environment surrounding the capacitive input device and the electromagnetic noise is neutralized by arranging the capacitive input device to enable application of a differential signal to sample the measurement signal at the capacitive input device. In one aspect, differential signaling is enabled via a capacitive input device comprising a primary capacitive structure and a parallel capacitive structure. The primary capacitive structure enables a user controlled input via relative movement of a portion of the primary capacitive structure and generates a first portion of a differential signal. The parallel capacitive structure has a structure having at least one portion arranged substantially the same as, and in a mirror orientation relative to, the primary capacitive structure. The parallel capacitive structure is stationary (i.e., does not permit relative movement of its components) and generates a second portion of the differential signal. Electromagnetic noise affects the primary capacitive structure and the parallel capacitive structure substantially the same so that the electromagnetic noise is effectively cancelled in the differential signal taken from the combination of the primary capacitive structure and the parallel capacitive structure. Accordingly, the measurement signal from the primary capacitive structure remains in the differential signal without the electromagnetic noise. In one aspect, any differences in the effect of the electromagnetic noise on the primary capacitive structure and the parallel capacitive structure is normalized prior to sampling the position measurement signal to insure that the electromagnetic noise is accurately neutralized.

In another embodiment, electromagnetic noise is neutralized by spreading out the noise over different frequencies via introduction of random variations in the frequency of the measurement signal and in the frequency of the sampling of the measurement signal. In one aspect, pseudo random frequency variations are applied to the measurement signal at the capacitive input device. In another aspect, pseudo random delays are applied to the signal that samples the measurement signal at the capacitive input device.

In one aspect, one or more embodiments of the present invention are employed together in various combinations. For example, in one embodiment, electromagnetic noise is neutralized by randomly varying sampling of the measurement signal (by time or frequency) to spread out the power of the electromagnetic noise and by also employing a parallel structure that enables the use of differential signaling to cancel out the electromagnetic noise common to the primary structure and the parallel structure of the capacitive input device. In another example, electromagnetic noise is neutralized by sampling the measurement signal only during radiofrequency pulses (or only inbetween adjacent radiofrequency pulses) and by also employing a parallel structure that enables the use of differential signaling to cancel out the electromagnetic noise common to the primary structure and the parallel structure of the capacitive input device. Finally, combinations of embodiments of the invention are not limited to the above-described exemplary combinations.

Accordingly, embodiments of the invention enable accurate capture of user control inputs at a capacitive input device by minimizing the effect of electromagnetic noise at the capacitive input device.

These embodiments, and additional embodiments of the invention, are described and illustrated in association with FIGS. 1-12.

FIG. 1 is a flow diagram illustrating a method 10 of capturing user control inputs at an electronic device, according to one embodiment of the invention. In one embodiment, method 10 is performed using systems and methods described and illustrated in association with FIGS. 2-12. In other embodiments, other systems and methods are employed to perform method 10.

As shown in FIG. 1, at 12 method 10 comprises capturing user control inputs via a capacitive input device associated with an electronic device. User control inputs include selectable functions of the electronic device, such as cursor control for a graphical user interface of the electronic device, scrolling functions, navigating menu functions, selectable communication functions, etc. At 14, electromagnetic noise is neutralized at the capacitive input device at (or near) the time the input measurement signal is sampled. In other words, the noise is neutralized as part of sampling the input measurement signal instead of minimizing noise via conventional mechanisms such as mechanical shielding or filtering. Embodiments of the invention directed to neutralizing electromagnetic noise in one or more ways are shown at 16, 17, and 18 of FIG. 1.

In one embodiment, at 16 the noise is neutralized by matching sampling of an input measurement signal at the capacitive input device with the occurrence of radiofrequency pulses. In one aspect, the input measurements are performed only at the same time that each of a plurality of radiofrequency pulses are being transmitted. In another aspect, the input measurements are sampled only in between the transmission of each of the plurality radiofrequency pulses. In other words, in this latter aspect, the input measurements are taken only when no radiofrequency pulse is being transmitted, such between a pair of adjacent pulses. In one aspect, this embodiment is further described and illustrated in association with FIG. 5.

In another embodiment, at 17 the noise is neutralized via the use of differential signaling to sample the input measurement signal in the presence of electromagnetic noise. In one aspect, a differential signaling arrangement is enabled via a primary capacitive structure for capturing the user control inputs and a parallel capacitive structure that includes one or more components substantially identical to the primary capacitive structure and positioned in a spaced, mirror orientation relative to the primary capacitive structure. The electromagnetic noise affects both the primary capacitive structure and the parallel capacitive structure substantially equally. However, because the components of the parallel capacitive structure are stationary, and the primary capacitive structure includes components permitting relative motion to enable capturing user control inputs, the application of differential signaling cancels out the electromagnetic noise common to both the primary capacitive structure and the parallel capacitive structure while preserving the input measurement signal carried by the primary capacitive structure. In one aspect, this embodiment is further described and illustrated in association with FIGS. 6A-10.

At 18, method 10 comprises neutralizing electromagnetic noise at the capacitive input device via randomly varying a parameter of sampling of the input measurement signal at the capacitive input device. In one aspect, sampling is randomly varied by substantially randomly varying a frequency parameter of sampling the input measurement signal. In another aspect, sampling is substantially randomly varied by introducing a random time delay parameter into sampling of the input measurement signal. In one aspect, a pseudorandom bit sequence generator generates a signal for use in applying the input measurement signal and/or in sampling the input measurement signal at the capacitive position sensor. The generator enables either controlling the random frequency sampling parameter or controlling the random time delay parameter to spread out the power of the electromagnetic noise, respectively, over a frequency spectrum or time spectrum, thereby increasing the signal to noise ratio for the input measurement signal at the capacitive input device. In one aspect, this embodiment is further described and illustrated in association with FIGS. 11-12.

Accordingly, method 10 increases the precision and accuracy in capturing user control inputs via a capacitive input device by neutralizing electromagnetic noise affecting the capacitive input device.

Figure 2:
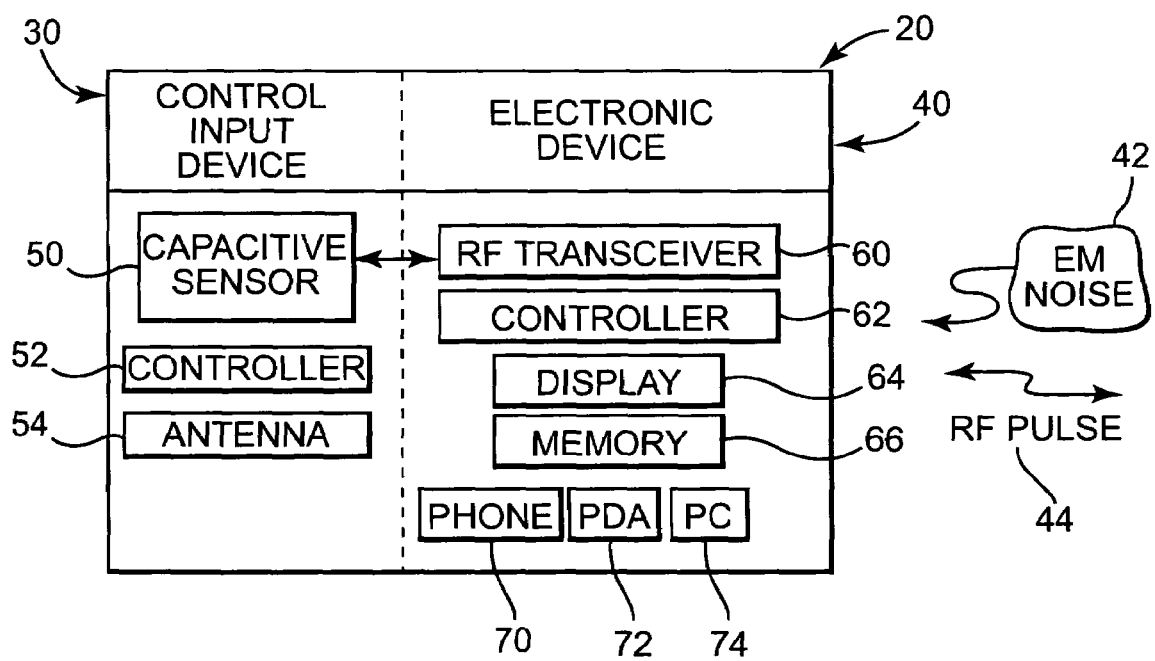
FIG. 2 is a block diagram illustrating an electronic device including a user control input device, according to an embodiment of the present invention.

FIG. 2 illustrates an electronic system 20 including a control input device 30 and an electronic device 40, according to one embodiment of the invention. As shown in FIG. 2, control input device 30 comprises a capacitive input sensor 50 and controller 52. In one aspect, control input device 30 comprises antenna 54 and in another aspect, control input device 30 omits antenna 54.

Electronic device 40 comprises, among other features, controller 62, display 64 and memory 66. In one embodiment, electronic device 40 includes any electronic device that includes a control input device configured to capture user control inputs via a capacitive input sensor 50. In one aspect, electronic device 40 is subject to electromagnetic (EM) noise 42 present in the environment surrounding electronic device 40 and/or control input device 30 and which becomes capacitively coupled relative to capacitive input sensor 50.

In another embodiment, electronic device 40 also comprises radiofrequency (RF) transceiver 60 to enable electronic device 40 to wirelessly communicate with other electronic devices and that includes control input device 30 configured to capture user control inputs via capacitive input sensor 50. In one aspect, RF transceiver 60 is configured to send and receive signals via any wireless communication protocol, such as BLUETOOTH®, WIFI®, wireless mobile phone protocols, etc., as known in the art. In one aspect, RF transceiver 60 wirelessly communicates with other devices via RF pulses 44, such as via Time Division Multiple Access (TDMA) protocol and/or other pulse-based wireless communication protocols.

In another aspect, RF transceiver 60 (and/or controller 62) of electronic device 40 is linked in electrical communication with capacitive input sensor 50 (and/or controller 52) of control input device 30 to enable RF transceiver 60 (and/or controller 62) to at least partially control operation of capacitive input sensor 50 (and/or controller 52). This communication link enables synchronizing the sampling of an input measurement signal at capacitive input sensor 50 relative to the operation of RF transceiver 60, thereby enabling neutralizing electromagnetic noise, such as RF pulses, as described and illustrated further in association with FIG. 5.

In one embodiment, electronic device 40 omits RF transceiver 60 but electronic device 40 is present within an environment in which RF pulses are present adjacent capacitive input device 30. In this embodiment, control input device 30 includes antenna 54 for receiving RF pulses from electronic device 40 (or another source) to provide a robust mechanism to identify and capture RF pulses for synchronizing or matching the sampling of the input measurement signal of the capacitive input sensor 50 relative to the pulses of the nearby RF signal and thereby neutralize the RF noise, as later described and illustrated further in association with FIG. 5.

In one aspect, electronic device 40 comprises a phone 70 (e.g., a mobile phone), a personal digital assistant 72, or a personal computer, such as a portable or desktop computer. However, in another aspect, electronic device 40 is not limited to these examples and encompasses any electronic device including circuitry and by which a capacitive input device 30 is used to capture user control inputs for operating at least one parameter associated with electronic device 40.

Electronic device 40 and/or capacitive input sensor 50 of control input device 30 are described in more detail relative to various embodiments of the invention in association with FIGS. 3-12.

In one embodiment, capacitive input device 30 comprises a capacitive input device comprising a base surface, a moveable puck, and a position detector. The moveable puck is confined to move over the base surface within a puck field of motion and the position detector identifies a position of the puck. Relative movement between the puck and the base surface generates movement data to produce a corresponding movement of a cursor (or other graphical element) on a display screen, as well other user control inputs such as selection of functions, menu navigation, etc. In one aspect, user control inputs relate to, but are not limited to, selecting or manipulating symbols visible on a display device, activating directional or speed inputs for video game controllers, for direct control of a mechanical or electrical system such as speed and turn inputs for controlling an automobile or toy vehicle, and menu navigation for portable electronic devices, such as mobile phones, portable audio devices, personal digital assistants, electronic cameras, etc.

One example of such a capacitive input device is described and illustrated in association with FIGS. 3A-4B as a foundation to a further description and illustration of embodiments of the invention in FIGS. 5-12 relating to neutralizing electromagnetic noise at a capacitive input device. However, embodiments of the invention are not strictly limited to capacitive input devices having the structure described and illustrated in FIG. 3A-4B.

Figure 3A:
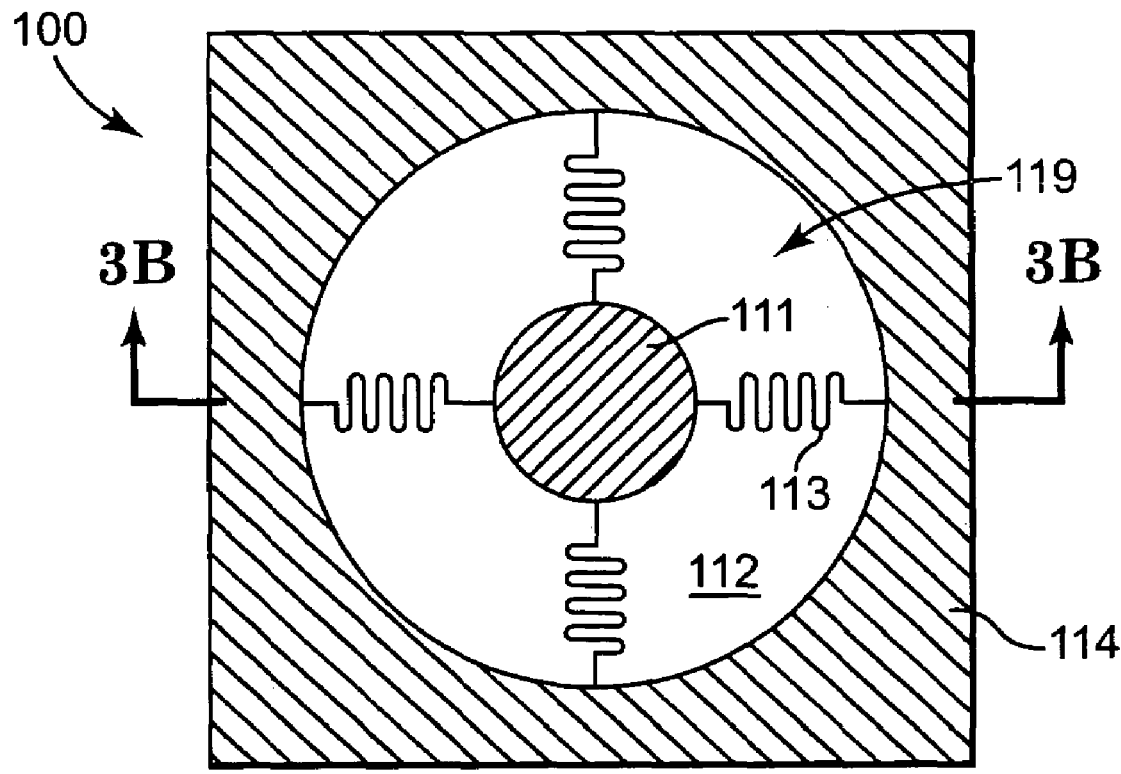
FIG. 3A is a top plan view illustrating an input device, according to an embodiment of the present invention.
Figure 3B:
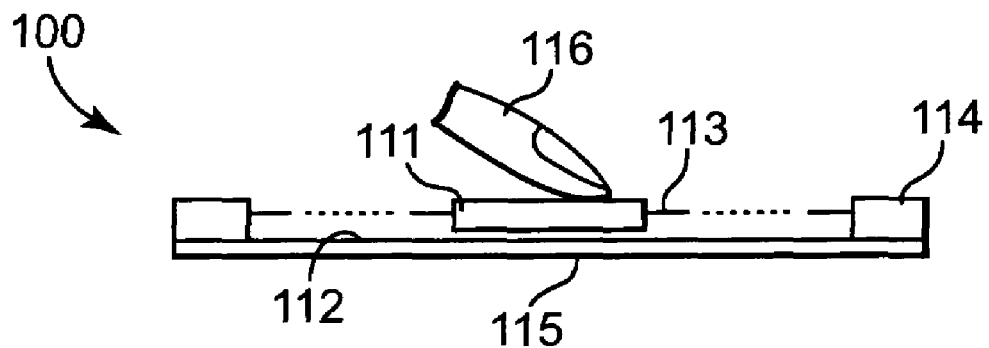
FIG. 3B is a sectional view of the input device of FIG. 3A as taken along lines 3B-3B, according to an embodiment of the invention.

FIG. 3A is diagram illustrating a top view of a capacitive input device 100, according to one embodiment of the present invention. FIG. 3B is a diagram illustrating a cross-sectional view along section line 3B-3B of the input device 100 shown in FIG. 3A, according to one embodiment of the present invention. In one embodiment, capacitive input device 100 comprises substantially the same features and attributes as capacitive input device 30 of FIG. 2.

As shown in FIGS. 3A and 3B, capacitive input device 100 includes a puck 111 that moves over a surface 112 of a substrate 115 within a puck field of motion 119 in response to a lateral force applied to puck 111. The force is typically applied to puck 111 by one or more fingers. Puck 111 includes a pressure sensing mechanism that measures the vertical pressure applied to puck 111. In addition, capacitive input device 100 includes a sensing mechanism for determining the position of puck 111 on surface 112.

When the user applies a vertical force to puck 111 that is greater than a predetermined threshold, any change in the position of puck 111 on surface 112 is reported to a host apparatus (e.g., electronic device 40) of which capacitive input device 100 forms a part. In one aspect, this change in position corresponds to a user control input for selecting or modifying a function of the electronic device, navigating a menu, scrolling on a display screen, as well as other types of user control inputs. In another aspect, this change in position is used to move a cursor on a display of the electronic device by a magnitude and a direction that depend on the magnitude and direction of the motion of puck 11 while the vertical force was applied to puck 111.

When the user releases puck 111 by removing the user's finger 116, puck 111 is returned to its centered position by the springs 113 that connect the puck 111 to the side 114 of the puck field of motion 119. Since the user's finger 116 is not applying a vertical force to puck 111 during its return, the change in position associated with that return motion is not reported to the electronic device. In one aspect, where the motion of the puck controls a screen cursor, the cursor remains at its current location. This provides a convenient "re-centering" capability, typically achieved on a mouse by lifting and replacing the mouse at the center of the field of motion. Re-centering is particularly important in laptop computers, hand-held devices such as wireless phones, personal digital assistants (PDA), and other miniature applications in which the field of motion is constrained.

In one preferred embodiment of the present invention, the pressure sensor in puck 111 senses two predetermined pressure levels. The first pressure level corresponds to a first amount of downward pressure on puck 111 and is used to actuate capturing user control inputs, such as tracking a cursor on a display, navigation a menu, etc. as described above. The second pressure level corresponds to a second amount of downward pressure, larger than the first pressure level, that is used activate a function associated with the electronic device. This second pressure level generally corresponds to the commonly referred to "click" function associated with a conventional pointing device such as a TouchPad™ or mouse. In another aspect, capacitive input device 100 comprises additional components to provide a tactile "click" feel to the application of second pressure level that generally corresponds with the mechanical "click" feel of a conventional pointing device.

However, embodiments of the invention are not strictly limited to capacitive input devices having the structure described and illustrated in FIG. 3A-4B.

Figure 4A:
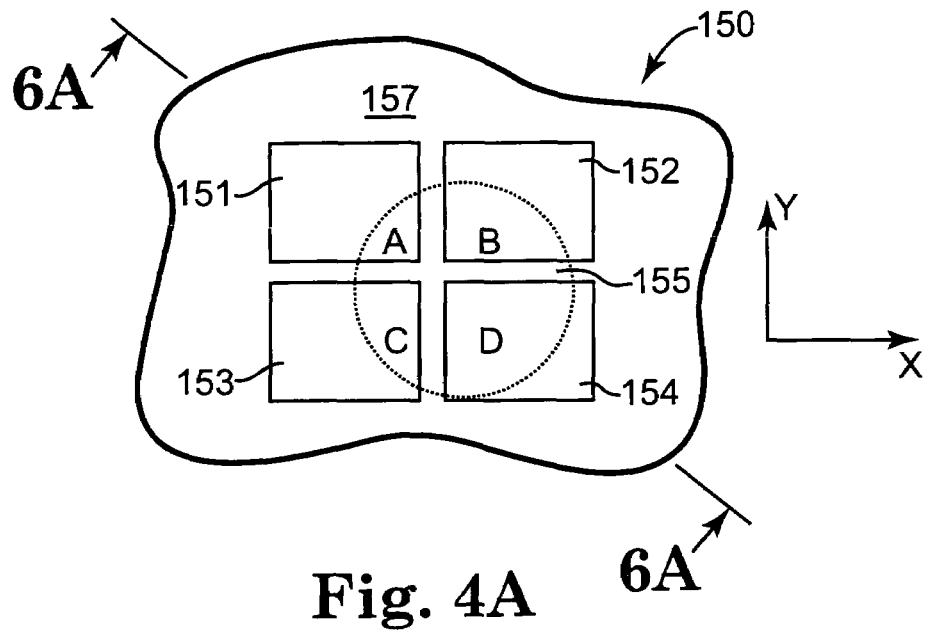
FIG. 4A is a top plan view illustrating a capacitive input device, according to an embodiment of the present invention.

FIG. 4A is a diagram illustrating a top view of a capacitive position sensor 150 forming a portion of capacitive input device 100 of FIGS. 3A-3B, according to one embodiment of the present invention. However, in other embodiments, capacitive position sensor 150 forms a portion of a capacitive input device other than capacitive input device 100 of FIGS. 3A-3B.

Capacitive position sensor 150 enables detection of the position of the puck 111 on surface 112 and, as shown in FIG. 4A, comprises position electrodes 151-154, sensor electrode 155, and surface 157. In one embodiment, surface 157 of capacitive position sensor 150 generally corresponds to surface 112 in FIG. 3A,3B and is arranged to position four position electrodes 151-154 at or adjacent to surface 157. Position electrodes 151-154 include terminals that are connected to an external control circuit, but which are omitted for illustrative purposes.

In one aspect, as shown in FIG. 4A, sensor electrode 155 as shown in phantom generally corresponds to a bottom surface of puck 111 (FIG. 3A, 3B). Each position electrode 151-154 and sensor electrode 155, respectively, is electrically isolated from one another. For example, sensor electrode 155 can be covered with an insulating layer (e.g., a dielectric material) enabling sensor electrode 155 to slide over the other position electrodes 151-54. Accordingly, the relationship of puck 111 and surface 112 of capacitive input device 100 (FIG. 3A, 3B) generally corresponds to the relationship of sensor electrode 155 and position electrodes 151-154, wherein sensor electrode 155 is generally parallel to and spaced from the position electrodes 151-154 to enable the sliding movement of sensor electrode 155 relative to position electrodes 151-154. The overlap between sensor electrode 155 and each respective position electrode 151-154 depends on the lateral (x-y) position of the sensor electrode 155 relative to position electrodes 151-154. The overlaps between sensor electrode 155 and position electrodes 151-54 are identified in FIG. 4A by the letters A-D, respectively.

Figure 4B:
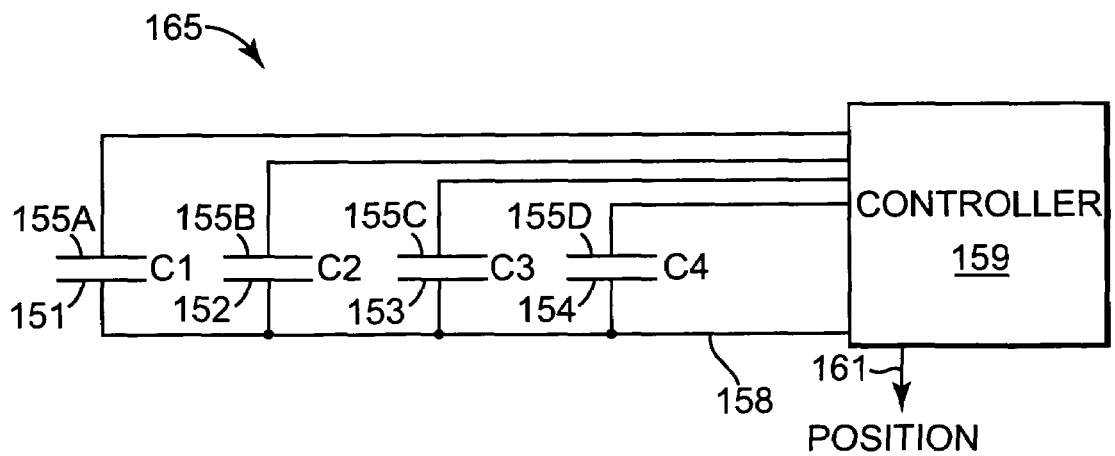
FIG. 4B is a schematic diagram illustrating an equivalent circuit for a capacitive input device, according to an embodiment of the present invention.

In one aspect, each position electrode 151-154 is capacitively coupled relative to sensor electrode 155, thereby enabling detection of an x-y position of sensor electrode 155 relative to position electrodes 151-154 based on tracking a change in the overlap capacitance between sensor electrode 155 relative to each respective position electrode 151-154, as further described in association with FIG. 4B.

FIG. 4B is a diagram illustrating an equivalent circuit 165 for the electrodes 151-155 shown in FIG. 4A, according to one embodiment of the present invention. The portions of sensor electrode 155 that overlap position electrodes 151-54 (FIG. 4A) are represented by electrodes 155A-155D, respectively, in FIG. 4B. The portion of sensor electrode 155 that overlaps position electrode 151 forms a parallel plate capacitor having a capacitance C1 that is proportional to overlap A. Similarly, the portion of sensor electrode 155 that overlaps position electrode 152 forms a parallel plate capacitor that has a capacitance C2 that is proportional to overlap B, and so on. Because all of the capacitors share portions of sensor electrode 155, the equivalent circuit 165 consists of four capacitors connected to a common electrode shown at 158. This electrode 158 corresponds to sensor electrode 155 in FIG. 4A. By measuring the overlap capacitance between sensor electrode 155 and each respective position electrode 151-154 (when driven to a voltage potential), the position of sensor electrode 155 (and correspondingly puck 111) relative to position electrodes 151-154 can be determined.

As sensor electrode 155 is moved relative to position electrodes 151-154, the overlap capacitance at each respective position electrode 151-154 changes. By tracking these changes, the relative movement of sensor electrode 155 is converted into a corresponding user control input using navigation processing algorithms which compare relative positions over time. Accordingly, finger controlled movement of a sensor electrode (or conductive puck) relative to an array of position electrodes enables capturing user control inputs for operation of an electronic device.

In one embodiment, this position determination is made by a controller 159, which may be part of the capacitive input device 100, or part of the electronic device 40 (e.g., controller 62) of which the capacitive input device 100 (e.g. capacitive input device 30) forms a part. In one embodiment, controller 159 outputs two-dimensional position information via input/output line 161, which identifies the current position of the puck 111.

It will be understood by a person of ordinary skill in the art that functions performed by controller 159 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Figure 5:
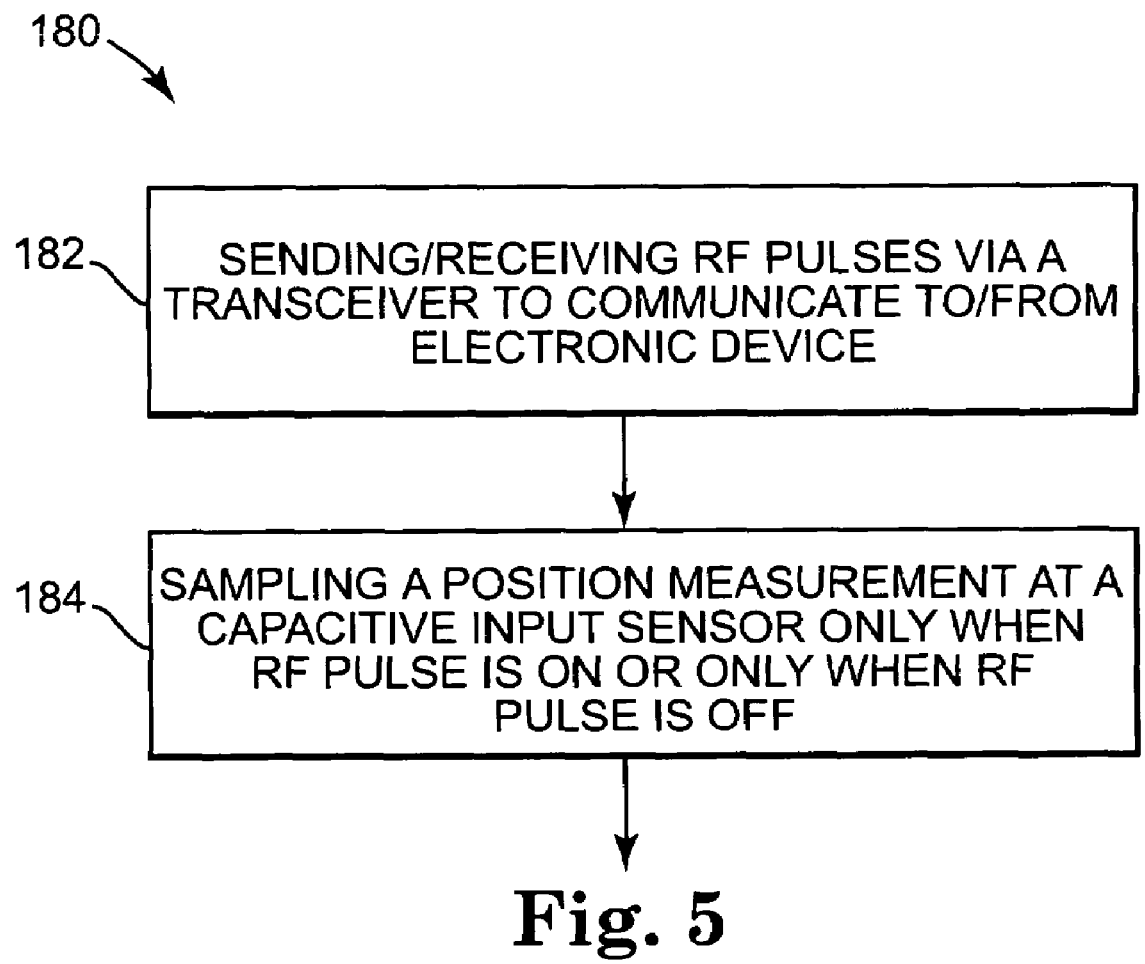
FIG. 5 is a flow diagram of a method of neutralizing electromagnetic interference at capacitive input device, according to an embodiment of the present invention.

FIG. 5 is a flow diagram of a method 180 of neutralizing radiofrequency noise relative to a capacitive input device, according to one embodiment of the invention. In one embodiment, method 180 is performed via electronic system 20 as described in association with FIGS. 2-4B. In other embodiments, method 100 is performed via other systems.

As shown in FIG. 5, at 182 one embodiment of method 180 comprises sending and/or receiving radiofrequency (RF)

pulses via a RF transceiver of an electronic device to wirelessly communicate to and from the electronic device with the electronic device also including a capacitive input device. In another embodiment, the RF pulses are not generated by or received by the electronic device including the capacitive input device but are present adjacent the electronic device to affect the capacitive input device of the electronic device.

At 184, a position measurement is sampled at a capacitive input device only during the transmission of RF pulses or only during the absence of RF pulses so that the sampling of the input measurement signal is made relative to a substantially constant amount of RF noise. In one aspect, when the sampling occurs only during respective RF pulses, substantially the same amount of RF noise is present throughout all sampling of the input measurement signal. In another aspect, when the sampling occurs only in between RF pulses, substantially no RF noise from the RF pulses affects the sampling of the input measurement signal at the capacitive input device.

Accordingly, method 180 position measurements at the capacitive position sensor are sampled with a consistent or uniform background of external noise, such as RF pulses.

Additional embodiments of the invention comprise a capacitive input device that include at least one conductive element arranged in a mirrored orientation relative to a capacitive position sensor to enable the use of differential signaling when sampling an input measurement signal at the capacitive position sensor to thereby enable neutralizing electromagnetic noise affecting the input measurement signal. As described and illustrated in association with FIGS. 6A-10, the at least one conductive element comprises one or more electrodes to provide a mirror overlap capacitance that enables differential signaling.

Figure 6A:
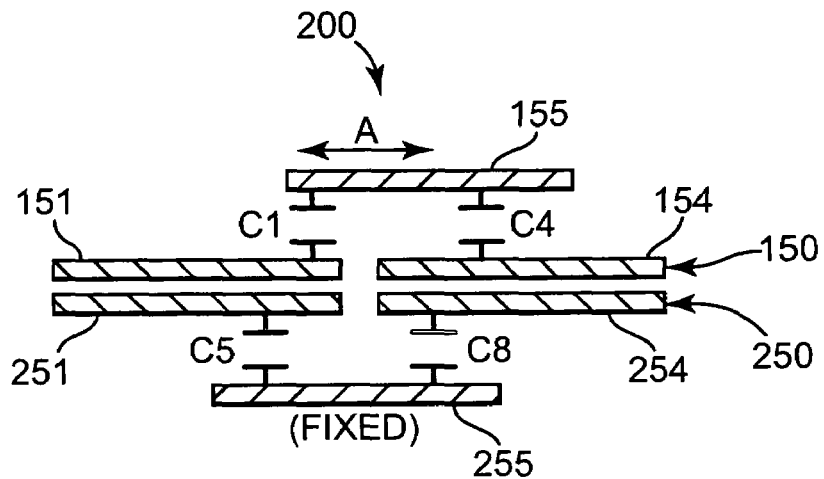
FIG. 6A is a sectional view of a capacitive input device as taken along lines 6A-6A of FIG. 4A, according to an embodiment of the present invention.

FIG. 6A is a sectional view of a capacitive position sensor 200. In one aspect, FIG. 6A is a sectional view of the embodiment of FIG. 4A of the sensing system 150 of capacitive input device 100 (FIG. 3A) as taken along lines 6A-6A of FIG. 4A, except further comprising a parallel capacitive structure 250, according to one embodiment of the invention. In this embodiment, parallel capacitive structure 250 provides the at least one conductive element that enables differential signaling. Parallel capacitive structure including substantially the same components as sensing system 150 (i.e., a primary capacitive structure 150) except arranged in a mirror orientation relative to sensing system 150 to enable application of a differential signal to sample a input measurement signal at capacitive position sensor 200.

As shown in FIG. 6A, parallel capacitive structure 250 comprises a sensor electrode 255 (i.e., sensor plate) and an array of position electrodes 251-254 (i.e., position plates), with only electrodes 251 and 254 being shown in the sectional view for illustrative purposes. The parallel capacitive structure 250 is substantially identical to primary capacitive structure 150, except that sensor electrode 255 is stationary or fixed relative to position electrodes 251-254 while sensor electrode 155 is slidably movable relative to position electrodes 151-154 (as represented by directional arrow A). While position electrodes 252 and 253 are not shown in FIG. 6A, position electrodes 251 and 254 are representative of the relationship of position electrodes 252 and 253 relative to sensor electrode 255.

A capacitance C5 represents the capacitive coupling of sensor electrode 255 relative to position electrode 251 and a capacitance C8 represents the capacitive coupling of sensor electrode 255 relative to position electrode 254. This structure also represents a corresponding arrangement for capacitive coupling of sensor electrode 255 relative to position electrodes 252 and 253 later shown in FIG. 6B.

Electromagnetic noise surrounding capacitive position sensor 200 is coupled to the overlap capacitances between each respective position electrode 151-154 and sensor electrode 155 of primary capacitive structure 150 and the capacitances between each respective position electrode 251-254 and sensor electrode 255 of mirror structure 250. The electromagnetic noise adjacent capacitive position sensor 200 has a substantially equal affect on the overlap capacitances of the respective primary capacitive structure 150 and parallel capacitive structure 250 either by the nearly identical arrangement of structures 150,250 (and/or by normalization of how electromagnetic noise affects differences between the two structures). On the other hand, only the overlap capacitance of the primary capacitive structure 150 is affected by the relative movement of sensor electrode 155. Accordingly, when a differential signal is applied via primary capacitive structure 150 and parallel capacitive structure 250 to make a x-y position measurement based on relative motion of sensor electrode 155 relative to position electrodes 151-154, the electromagnetic noise is cancelled out or neutralized while the x-y position measurement signal is preserved.

In one embodiment, with sensor electrode 155 in a centered position relative to position electrodes 151-154, a calibration module (stored within controller 159 or elsewhere) is used to sample the overlap capacitances of each primary capacitive structure 150 and parallel capacitive structure 250 to normalize comparisons of the respective overlap capacitances (of the respective primary capacitive structure 150 and parallel capacitive structure 250) when sensor electrode 155 is centered and/or during position sensing when sensor electrode is in a non-centered position (or in motion).

In another aspect, a calibration module (stored in controller 159 or elsewhere) also normalizes the overlap capacitances of the respective primary capacitive structure 150 and parallel capacitive structure 250 to the extent that the electromagnetic noise affects the primary capacitive structure 150 differently than the parallel capacitive structure 250 during movement of sensor electrode 155.

Based on normalizing the respective overlap capacitances for primary capacitive structure 150 and parallel capacitive structure 250 when sensor electrode 155 is centered and/or is moved, a differential signal based on these two structures effectively neutralizes the electromagnetic noise and maintains the position measurement signal of the position of the sensor electrode 155.

Accordingly, mirror capacitive structure 250 acts to neutralize electromagnetic noise affecting primary capacitive structure 150 of capacitive position sensor 200, thereby increasing a signal-to-noise ratio and enhancing the accuracy of capacitive position sensor 200 in capturing user control inputs.

Figure 6B:
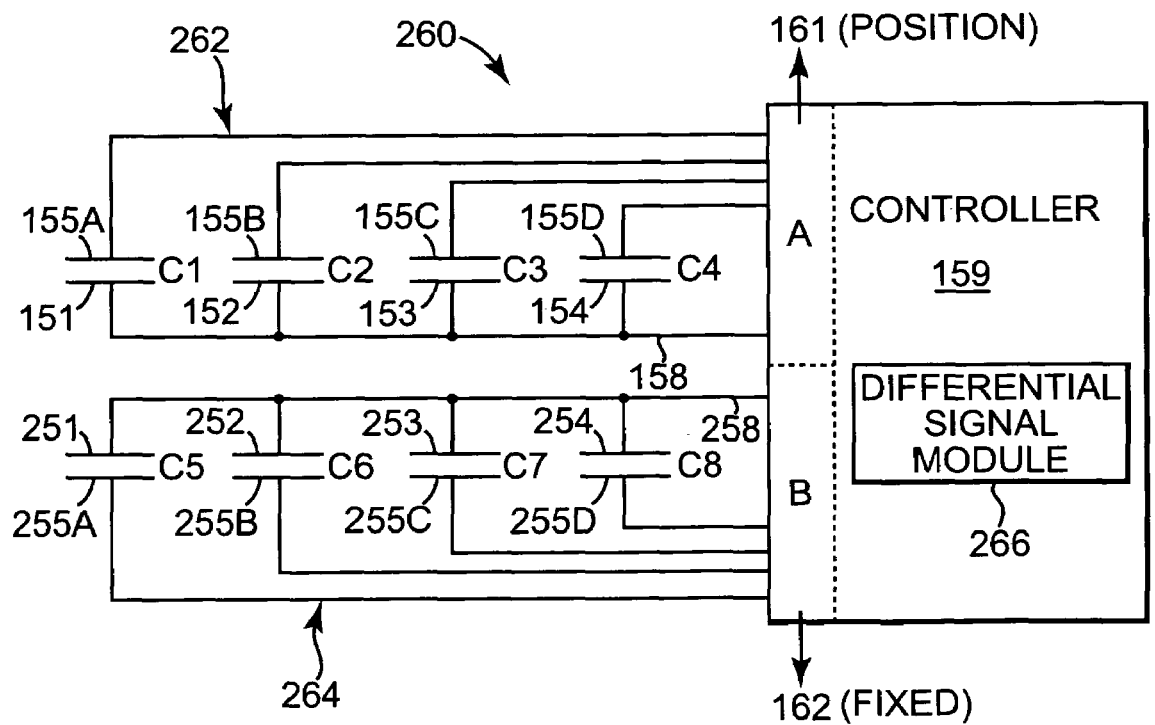
FIG. 6B is a schematic diagram of an equivalent circuit for a capacitive input device, according to an embodiment of the present invention.

FIG. 6B is a diagram illustrating an equivalent circuit 260 corresponding to capacitive position sensor 200, according to one embodiment of the invention. As shown in FIG. 6B, equivalent circuit 260 includes a first portion 262 representing the electrodes 151-155 of primary capacitive structure 150 and a second portion 264 representing electrodes 251-255 of parallel capacitive structure 250 shown in FIG. 6A, according to one embodiment of the present invention. First portion 262 generally corresponds to a first component A and second portion 264 generally corresponds to a second component B of a differential signal associated with differential signal module 266. Accordingly, first portion 262 and second portion 264 enable use of differential signaling via differential signal module 266 of controller 159 to both track a position of sensor electrode 155 and to neutralize electromagnetic noise at equivalent circuit 260.

First portion 262 of circuit 260 comprises substantially the same features and attributes as equivalent circuit 160 of FIG. 3B. Second portion 264 of circuit 260 also comprises substantially the same features and attributes as equivalent circuit 160 of FIG. 3B except being arranged in a mirror orientation relative to first portion 262 and having a sensor electrode 255 that is in a fixed position relative to position electrodes 251-254.

Second portion 264 of circuit 260 comprises the following arrangement. In one aspect, the portions of electrode 255 that overlap electrodes 251-254 are represented by electrodes 255A-255D, respectively, in FIG. 6B. The portion of electrode 255 that overlaps electrode 251 forms a parallel plate capacitor having a capacitance C5 that is proportional to overlap A. Similarly, the portion of electrode 255 that overlaps electrode 252 forms a parallel plate capacitor that has a capacitance C6 that is proportional to overlap B, and so on. Since all of the capacitors share portions of electrode 255, the equivalent circuit consists of four capacitors connected to a common electrode shown at 258. This electrode 258 corresponds to electrode 255 in FIG. 6A. Because electrode 255 does not move relative to electrodes 251-254 (i.e. is stationary), the overlap capacitances C5-C8 remain substantially constant over time.

By applying the calibration algorithms as described in association with FIG. 6A to normalize the differences (dielectric materials, spacing, etc.) between the primary capacitive structure 150 (represented by first portion 262) and the parallel capacitive structure 250 (represented by second portion 264), and then applying differential signaling when sampling an input measurement signal for capacitive position sensor 200, a position signal is obtained with a low signal-to-noise ratio because of the neutralization of the electromagnetic noise between first portion 262 and second portion 264 of circuit 260.

Figure 7:
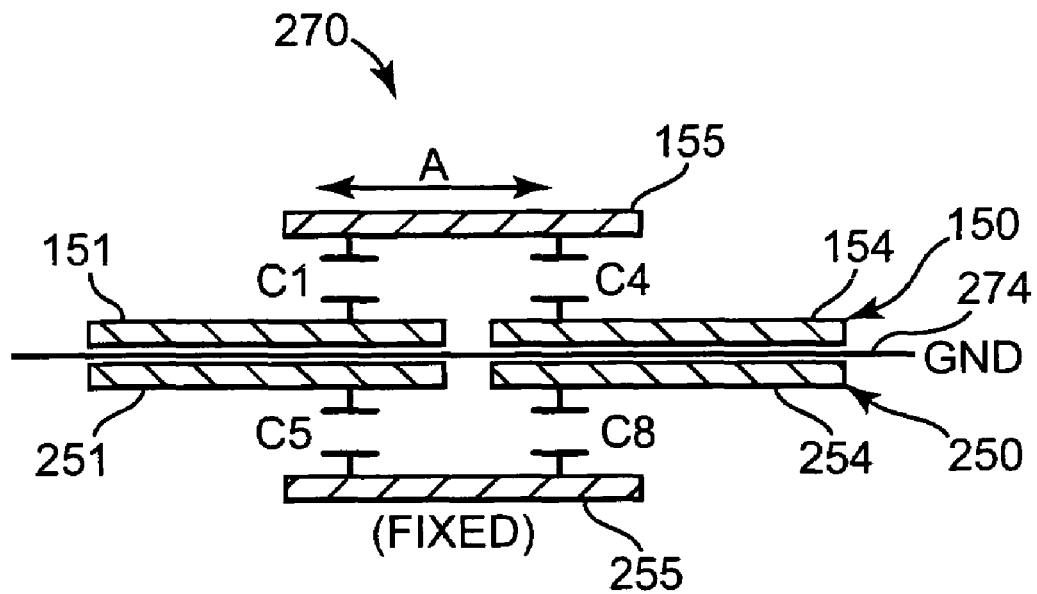
FIG. 7 is a sectional view of a capacitive input device including a parallel capacitive structure, according to an embodiment of the invention.

FIG. 7 is a sectional view illustrating a capacitive position sensor 270, according to one embodiment of the invention. In one aspect, capacitive position sensor 270 comprises substantially the same features as capacitive position sensor 200 of FIG. 6, except further comprising a ground reference conductor 274 (as shown in FIG. 7) positioned between the primary capacitive structure 150 and parallel capacitive structure 250. In one aspect, ground reference conductor 274 extends between position electrodes 151-154 and position electrodes 251-254 to separate the respective sets of position plates relative to each other.

Figure 8:
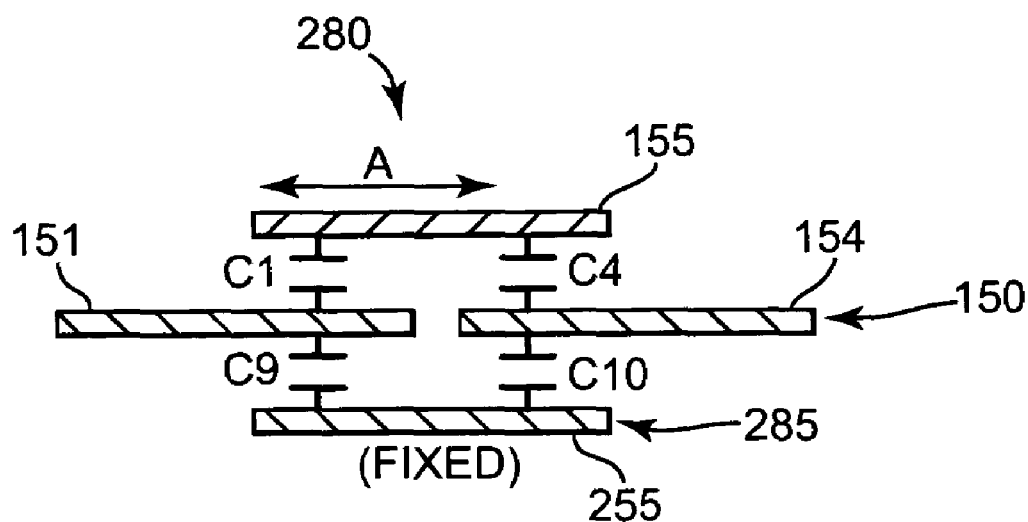
FIG. 8 is a sectional view of a capacitive input device including a parallel capacitive structure, according to an embodiment of the invention.

FIG. 8 is sectional view illustrating a capacitive position sensor 280, according to one embodiment of the invention, having substantially the same features as capacitive position sensor 200 of FIG. 6, except including a parallel capacitive structure 285 that omits position electrodes 251-254. In this embodiment, parallel capacitive structure 285 comprises sensor electrode 255 disposed on an opposite side of position electrodes 151-154 relative to sensor electrode 155 and acts as the mirror conductive element that enables the use of differential signaling for capacitive position sensor 280. Sensor electrode 255 is stationary relative to position electrodes 151-154, and relative to slidably movable sensor electrode 155. A capacitance C1 represents the capacitive coupling of sensor electrode 155 relative to position electrode 151 and a capacitance C4 represents the capacitive coupling of sensor electrode 155 relative to position electrode 154. This structure also represents a corresponding arrangement for capacitive coupling of sensor electrode 155 relative to position plates 152 and 153 (FIGS. 4A-4B) not shown in FIG. 8 for illustrative clarity. A capacitance C9 represents the capacitive coupling of sensor electrode 255 relative to position electrode 151 and a capacitance C10 represents the capacitive coupling of sensor electrode 255 relative to position electrode 154. This structure also represents a corresponding arrangement for capacitive coupling of sensor electrode 255 relative to position electrode 152 and 153 not shown in FIG. 8 for illustrative clarity.

Electromagnetic noise surrounding capacitive position sensor 280 is coupled to the overlap capacitances between each respective position electrode 151-154 and sensor electrode 155 of primary capacitive structure 150 and the overlap capacitances (e.g., C9, C10) between each respective position plate 151-154 and sensor electrode 255 of parallel capacitive structure 285. Because the electromagnetic noise adjacent capacitive position sensor 280 affects primary capacitive structure 150 and parallel capacitive structure 285 substantially equally (after applying discretionary normalization), when x-y position measurements are made based on relative motion of sensor electrode 155 relative to position plates 151-154 (as represented by directional arrow A), the electromagnetic noise is cancelled or neutralized relative to the x-y position measurement signal.

Figure 9:
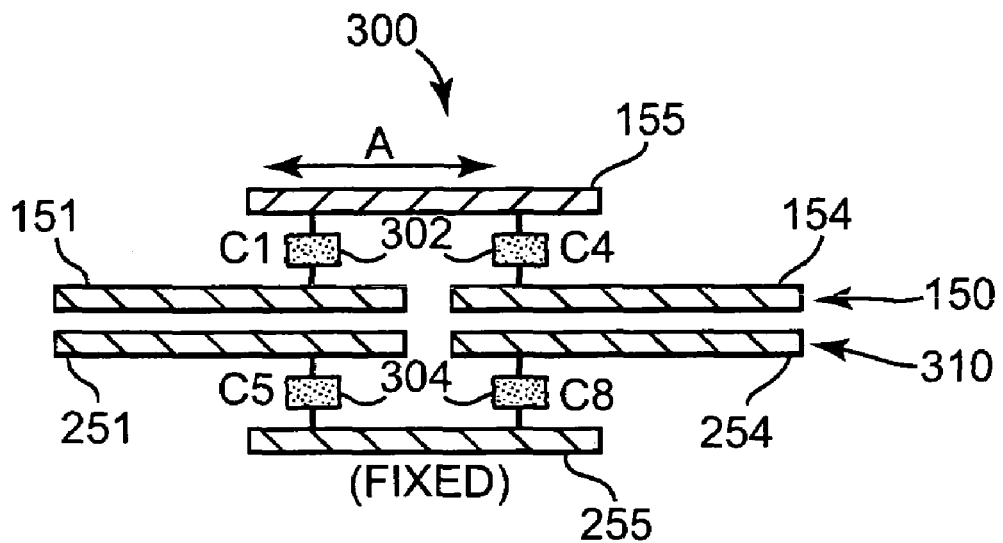
FIG. 9 is a sectional view of a capacitive input device including a parallel capacitive structure, according to an embodiment of the invention.

FIG. 9 is sectional view illustrating a capacitive position sensor 300, according to one embodiment of the invention, having substantially the same features as capacitive position sensor 200 of FIG. 6A, except further comprising a known dielectric member 302 positioned between sensor electrode 155 and the respective position electrodes 151-154 and a known dielectric member 304 positioned between sensor electrode 255 and the respective position electrodes 251-254. In one aspect, dielectric member 302 and dielectric member 304 have substantially the same dielectric value and are made of substantially the same dielectric material. In this arrangement, introducing a dielectric material in both primary capacitive structure 150 and parallel capacitive structure 310 insures that the effect of the electromagnetic noise on the capacitance at primary capacitive structure 150 and the capacitance at parallel capacitive structure 310 is substantially the same. In turn, this arrangement insures that the parallel capacitive structure 310 acts to neutralize the electromagnetic noise relative to the position measurement signal measured via primary capacitive structure 150.

Figure 10:
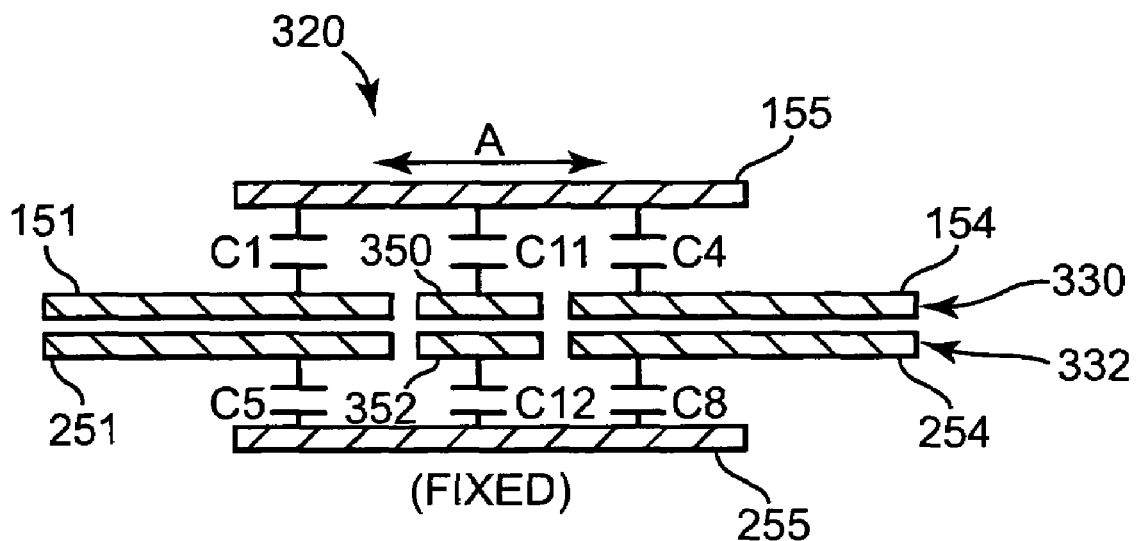
FIG. 10 is a sectional view including a parallel capacitive structure, according to an embodiment of the invention.

FIG. 10 is a sectional view illustrating a capacitive position sensor 320, according to one embodiment of the invention. As shown in FIG. 10, capacitive position sensor 320 comprises substantially the same features and attributes as capacitive position sensor 200 of FIG. 6A except further comprising a central position plate 350 located centrally, and generally concentrically between position electrodes 151-154, and a corresponding parallel central position plate 352 positioned in between position electrodes 251-254. A capacitance C11 represents the capacitive coupling between sensor plate 155 and central position plate 350 and a capacitance C12 represents the capacitive coupling between sensor plate 255 and central position plate 352. Position electrodes 151-154, 350 shown in FIG. 10 have generally the same arrangement as position electrodes 151-154 in FIG. 6A, except having a shape and size to accommodate the introduction of central position electrode 350. Likewise, position electrodes 251-254, 352 shown in FIG. 10 have generally the same arrangement as position electrodes 251-254 (FIG. 6A), except having a shape and size to accommodate the introduction of central position electrode 352.

In all other respects, capacitive position sensor 320 operates substantially the same as capacitive position sensor 200 and uses primary capacitive structure 330 and parallel capacitive structure 332 to enable a differential signal to detect x-y position measurements while neutralizing electromagnetic noise because both the primary structure and the mirror structure have substantially the same electromagnetic noise capacitively coupled to each respective structure (after discretionary normalization of the electromagnetic noise).

Figure 11:
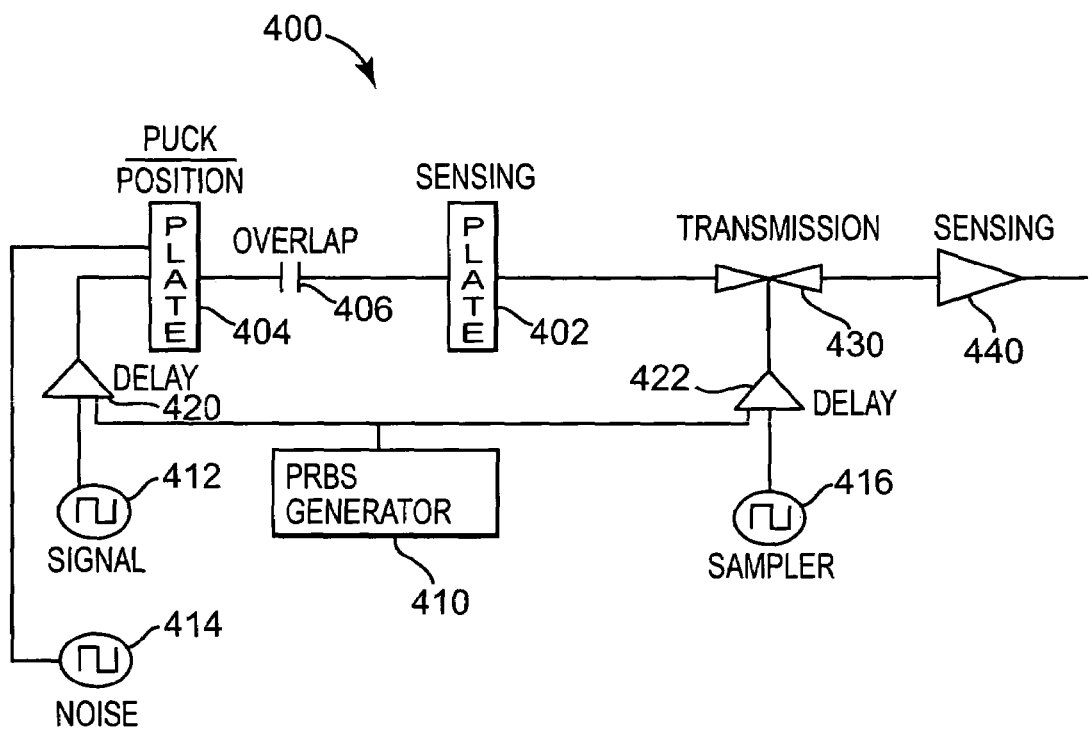
FIG. 11 is a diagram illustrating a capacitive input system, according to an embodiment of the invention.

FIG. 11 is a diagram illustrating a position measurement system 400 in an environment including electromagnetic noise 414, according to one embodiment of the invention. Position measurement system 400 operates as a capacitive position sensor and comprises substantially the same features as capacitive position sensor 50, 150 for a portable electronic device (e.g., electronic device 40 of FIG. 2). Electromagnetic noise 414 emanating from a wireless communicator or other circuitry becomes capacitively coupled relative to the overlap capacitance 406 in system 400, and thereby becomes intermingled with the position measurement signal of capacitive position sensor 50, 150.

Noise 414 negatively affects the performance of the capacitive position sensor of the position measurement system associated with the electronic device. In one aspect, noise 414 is generally corresponds to aliased periodic electromagnetic noise affecting sampling of an input/position measurement signal. In one example, the electromagnetic noise appears at a sensing circuit (such as position measurement system 400) as in-band low frequency periodic noise and becomes erroneously interpreted as part of the actual position measurement signal. However, other sources and types of electromagnetic noise also act as noise 414 that negatively affects capacitive input devices.

System 400 enables spreading out the power of electromagnetic noise 414, according to one embodiment of the invention. As shown in FIG. 11, system 400 comprises sensor plate 402 and at least one position plate 404 arranged in capacitively coupled relationship to form an overlap capacitance 406 in a manner substantially the same as capacitive position sensors 50,150 (as previously described and illustrated in association with FIGS. 1-4B). In one embodiment, system 400 also comprises pseudo random bit sequence (PRBS) generator 410, signal generator 412, sampling signal generator 416, programmable delay 420, programmable delay 422, transmission gate 430 and sensing amplifier 440.

Signal generator 412 generates a position measurement signal detectable via overlap capacitance 406 while sampling signal generator 416 generates a sampling signal to sample the position measurement signal at periodic intervals to detect the x-y movement of sensing plate 402 relative to the position plate(s) 404. Transmission gate 430 enables the position measurement signal to pass to sensing amplifier 440 according to the periodic intervals of the sampling signal from sampling signal generator 416. Programmable delay 420 adds a delay in the position measurement signal which occurs at substantially random intervals, as driven by random sequence generator 410. Likewise, programmable delay 420 adds a delay in the sampling signal which occurs at substantially random intervals, as driven by random sequence generator 410. In one aspect, the programmable delay 420 is linked to and has substantially the same delay as programmable delay 422. In another aspect, the programmable delay 420 has a different delay relative to programmable delay 422.

By randomly delaying the sampling signal, the position measurements are effectively spread out the measurement information over a range of frequencies, which in turn, spreads out the power of aliased noise. This arrangement increases the signal to noise ratio for position measurements of the capacitive position sensor relative to electromagnetic noise.

Figure 12:
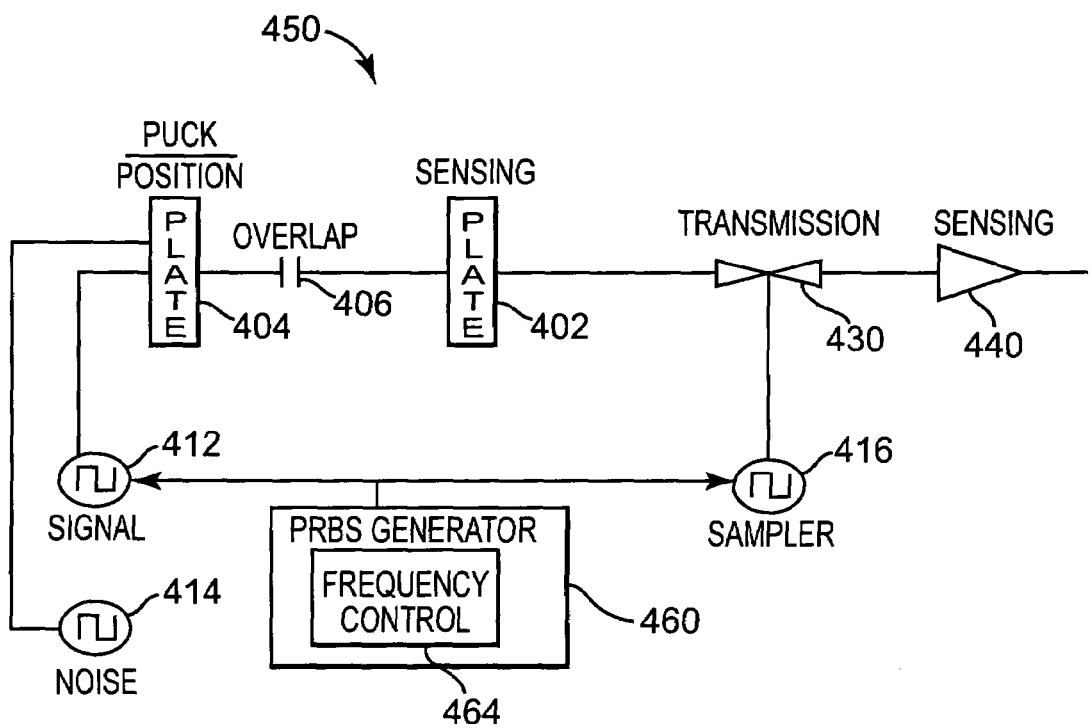
FIG. 12 is a diagram illustrating a capacitive input system, according to an embodiment of the invention.

FIG. 12 is a diagram illustrating a position measurement system 450 in an environment including electromagnetic noise 414, according to one embodiment of the invention. As shown in FIG. 12, system 400 comprises substantially the same features and attributes as system 400 of FIG. 11 except omitting delay 420, 422 and including signal generator 460 with frequency controller 464 instead of signal generator 410.

Frequency controller 464 in association with PRBS generator 460 operates to randomly vary the frequency of the position measurement signal and/or the frequency of the sampling signal. By varying the frequency of the sampling signal, the sampled position measurements effectively spread the measurement information over a range of frequencies, which in turn, spreads out the power of aliased noise. This arrangement increases the signal to noise ratio for position measurements of the capacitive position sensor relative to electromagnetic noise.

Embodiments of the invention virtually isolate position measurements at a capacitive position sensor without conventional shielding or filtering by neutralizing radiofrequency noise and/or electromagnetic noise by managing the timing (or frequency) of the sampling of the position measurement signal or by using differential signaling at the capacitive position sensor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A capacitive input device comprising:
a capacitive position sensor including:
   a plurality of first position electrodes extending in generally the same plane and laterally spaced apart from each other; and
   a first sensor electrode generally parallel to and spaced from the plurality of position electrodes, the first sensor electrode being capacitively coupled and slidably movable relative to the first position electrodes;
at least one conductive element positioned generally parallel to and spaced from the plurality of first position electrodes on an opposite side of the plurality of first position electrodes relative to the sensor electrode, the at least one conductive element being stationary relative to the first position electrodes; and
a differential signal controller configured to sample a position measurement signal relative to an overlap capacitance at the capacitive position sensor and the at least one conductive element.

2. The capacitive input device of claim 1, and further comprising:
a ground reference element positioned between the plurality of first position electrodes and the at least one conductive element.

3. The capacitive input device of claim 1 wherein the at least one conductive element comprises:
a plurality of second position electrodes extending in generally the same plane to, and laterally spaced apart from, each other; and
a second sensor electrode generally parallel to and spaced from the plurality of second position electrodes and being capacitively coupled relative to the second position electrodes;
wherein the plurality of second position electrodes and the second sensor electrode are positioned on an opposite side of the first position electrodes relative to the first sensor electrode, and the second sensor electrode is stationary relative to the second position electrodes.

4. The capacitive input device of claim 3, and further comprising:
a first dielectric member disposed between the first sensor electrode and each respective first position electrode; and
a second dielectric member disposed between the second sensor electrode and each respective second position electrode,
wherein the first dielectric member and the second dielectric member are made of the same dielectric material and have the same dielectric value.

5. The capacitive input device of claim 3 wherein the plurality of first position electrodes comprises a first center position electrode located centrally between the other respective first position electrodes and the plurality of second position electrodes comprises a second center position electrode located centrally between the other respective second position electrodes.

6. The capacitive input device of claim 1 wherein the at least one conductive element comprises:
a second sensor electrode generally parallel to and spaced from the plurality of first position electrodes and being capacitively coupled to the first position electrodes, the second sensor electrode being positioned on an opposite side of the first position electrodes relative to the first sensor electrode and having a fixed position relative to the first position electrodes.

7. The capacitive input device of claim 1 and further comprising an electronic device incorporating the capacitive input device to enable capture user control inputs for the electronic device via the capacitive input device.

8. A capacitive input system comprising:
a capacitive position sensor; and
a position signal circuit coupled to the capacitive position sensor and configured to periodically sample a position measurement signal at the capacitive position sensor at substantially random intervals;
wherein the capacitive position sensor comprises:
a plurality of position electrodes extending in generally the same plane and laterally spaced apart from each other; and
a sensor electrode generally parallel to and spaced from the plurality of position electrodes, the sensor electrode being capacitively coupled and slidably movable relative to the position electrodes;
at least one conductive element generally parallel to and spaced from the plurality of position electrodes, positioned on an opposite side of the plurality of position electrodes relative to the sensor electrode and fixed relative to the position electrodes; and
a differential signal controller configured to sample the position measurement signal as an overlap capacitance relative to the capacitive position sensor and relative to the at least one conductive element.

9. The capacitive input system of claim 8 wherein the position signal circuit comprises a pseudo random signal generator configured to enable a signal mechanism to produce the position measurement signal at the capacitive position sensor and to enable a sampler mechanism to periodically sample the position measurement signal.

10. The capacitive input system of claim 9 wherein the position signal controller comprises a frequency controller coupled to the pseudo random signal generator to randomly vary both a frequency of the position signal and a frequency at which the position signal is periodically sampled via the signal sampler mechanism.

11. The capacitive input system of claim 9 wherein the position signal controller enables periodic sampling at substantially random intervals via a time delay mechanism configured to introduce a random time delay in the periodic sampling of the position signal.

* * * * *